Patented Aug. 13, 1946

2,405,926

UNITED STATES PATENT OFFICE 2,405,926

PRESSURE SENSITIVE ADHESIVE

Rudolf J. Priepke, North Brunswick Township, Middlesex County, John H. Emigh, Milltown, and Charles Olson Pike, Highland Park, N. J., assignors to Industrial Tape Corporation, a corporation of New Jersey No Drawing. Application November 5, 1943, Serial No. 509,150

8 Claims. (Cl. 106—172)

This invention relates to a pressure sensitive adhesive and to an adhesive sheet made therewith.

In the manufacture of adhesive tapes or sheets, it is substantially more difficult to effect proper anchorage of a mass to a non-fibrous backing such as regenerated cellulose which has a smooth lustrous surface than to a fibrous backing such as cloth or paper which have surfaces permitting some mechanical interlocking with the mass. With fibrous materials, the adhesive mass usually can be applied directly thereto. With non-fibrous materials, on the other hand, it is customary to use an intermediate primer or subbing coat which has an affinity both for the backing material and the mass to effect a proper bond. In the absence of such an intermediate coat, there occurs, when the sheet or tape is unwound from a roll, offsetting of the adhesive, i. e., portions of the adhesive mass are deposited upon the back of the sheet or tape since the affinity of the adhesive mass is as great for one side of the backing as for the other.

According to the present invention, there is provided an improved tape or sheet having a non-fibrous backing as for instance regenerated cellulose possessing a smooth lustrous surface to which the mass is directly applied and which is free of most vices heretofore possessed by such sheets in the absence of a priming coat. The mass is of a special character. It has properties such that at the time it is applied to a backing film of regenerated cellulose, a firm bond is established therewith which subsequently is greater than the adhesion that prevails between the mass and other surface to which the sheet is applied. This is true even as regards the opposed surface of the regenerated cellulose film itself with which the mass is in contact when the film or sheet is wound up into a roll.

The adhesive compositions employed in the improved adhesive sheets contain condensation products of castor oil with half esters of maleic acid. These condensation products normally lack the requisite internal or cohesive strength for use in pressure sensitive adhesives. However, by processing they may be brought to a semi-solid state in which they possess certain elastomeric or rubber-like characteristics such as elasticity, extensibility and cushioning properties, combined with increased cohesive strength which renders them admirably suitable for use as the basic element of a pressure sensitive adhesive mass.

In the semi-solid state, more accurately defined hereinafter, the material possesses a certain amount of inherent tack and may be used as a pressure sensitive adhesive mass without modification. However, it is preferred that there be mixed with the processed material suitable agents for increasing its internal strength and tack.

The improved adhesives have excellent aging qualities. Their adhesion remains substantially constant over long periods of time and is not appreciably affected by exposure to sunlight or air. They have a high degree of transparency which renders them particularly applicable for use with transparent backings in the manufacture of transparent adhesive tapes. They may be colored if desired by incorporating pigments or dyes.

In addition to regenerated cellulose, other backing materials may be employed such as cloth, paper, metals, synthetic resins and synthetic plastics to mention a few.

The preparation of condensation products of castor oil with half esters of maleic acid is fully disclosed in the Bruson Patent 2,081,266. According to that patent, castor oil is heated with a monohydric alcohol such as alpha-terpineol, ethylene glycol monoaliphatic ethers such as the diethylene glycol monoaliphatic ethers, octyl alcohol, or mixed higher alcohols having a boiling range between 150° C. and 250° C. and maleic anhydride or maleic acid in proportions equivalent to 1 mole of castor oil, for 1 to 3 moles of maleic half ester. The material is then processed to render it suitable for use in a pressure sensitive adhesive mass. To this end, the condensate is brought to a semi-solid state as by continuous mechanical agitation at temperatures preferably between 100° C. and 250° C. for periods of time ranging correspondingly between six days and a few minutes.

Various methods may be employed to define this semi-solid state. One method is to express the required consistency of the material in terms of its rheological properties as measured on a rotation plastometer similar in principle to the viscosimeter described by Traxler and his coworkers in the analytical edition of Industrial and Engineering Chemistry, volume 14, page 340, (1943). The measuring device employed consists of two horizontally disposed concentric steel rings presenting an intermediate space having an inner radius of 2.86 cm., an outer radius of 3.45 cm. and a height of 0.95 cm. The outer steel ring is fixed, whereas the inner steel ring is rotatable at adjusted speeds by means equipped to measure the magnitude of the torsional moment required to effect such rotation. The space between the inner and outer rings is completely filled with the material to be tested and the torsional moment exerted on the inner ring is adjusted to rotate the ring at a speed of 1 degree per minute. Under such conditions, the magnitude of the torsional moment required to rotate the inner ring at a given temperature is an accurate indication of the viscosity or flow characteristics of the material at that temperature.

For the purposes of this invention, condensation products of castor oil and half esters of maleic acid have been found suitable which require for the rotation of the inner ring at a temperature of 25° C., a torsional moment of 80,000 to 800,000 dyne-centimeters. It is considered that material within this range is in a semi-solid state.

Condensates of castor oil with maleic half esters firmer than those in the semi-solid state do not possess the requisite degree of solubility in the solvents customarily used for spreading pressure sensitive adhesive masses and are too incompatible for mixing with the compounding agents employed therein. On the other hand, the more liquid condensation products do not have the requisite internal or cohesive strength. Within the range given, however, these semi-solid materials exhibit most of the characteristics desirable for use in pressure sensitive adhesives and can be used alone as such. However, it is preferred to mix with these materials, small amounts of agents which will enhance their cohesive strength and where such agents act to lower the adhesive properties of the materials, small amounts of tackifying resins may be added. Among the compatible cohesive agents that may be employed with the condensation products are nitrocellulose and ethyl cellulose. Compatible tackifying resins include such rosinous materials as plain rosin, ester gum, dehydrogenated rosin, and hydrogenated rosin and its derivatives such as glycerine ester of hydrogenated rosin. In the following examples, typical compositions useful in pressure sensitive adhesives are listed:

*Example 1*

Percentage by weight

| | |
|---|---|
| Condensation product of castor oil and the maleic anhydride half ester of diethylene glycol monobutyl ether (torsional moment measurement approximately 150,000 dyne-centimeters at 25° C.) | 82 |
| Nitrocellulose (viscosity medium high) | 9 |
| Glycerine ester of hydrogenated rosin | 9 |

*Example 2*

Percentage by weight

| | |
|---|---|
| Condensation product of castor oil, maleic anhydride and alpha-terpineol (torsional moment measurement approximately 500,000 dyne-centimeters at 25° C.) | 94 |
| Ethyl cellulose (high viscosity) | 6 |

*Example 3*

Percentage by weight

| | |
|---|---|
| Condensation product of castor oil, maleic anhydride and cyclohexanol (torsional moment measurement approximately 650,000 dyne-centimeters at 25° C.) | 83 |
| Ethyl cellulose (medium high viscosity) | 7 |
| Dehydrogenated rosin | 10 |

*Example 4*

Percentage by weight

| | |
|---|---|
| Condensation product of castor oil, maleic acid and alpha-terpineol (torsional moment measurement approximately 100,000 dyne-centimeters at 25° C.) | 75 |
| Ethyl cellulose (high viscosity) | 7 |
| Ester gum | 18 |

In general, it may be stated that good pressure sensitive adhesive compositions may be made with 70 to 100% of semi-solid castor oil maleic half ester condensation product, 0 to 20% cohesive agent and from 0 to 25% tackifying resin, depending upon the degree of cohesiveness or tack desired.

Solvent spreading is preferred for applying the improved adhesive compositions to the sheet backing. Solvents of the aromatic type such as toluol or mixtures thereof may be used with compositions involving ethyl cellulose, while ester type solvents such as butyl acetate may be used in combinations with nitrocellulose.

When the adhesive compositions described herein are solvent spread directly upon regenerated cellulose films, a very firm bond is generated. After the solvent has evaporated, this bond remains intact and is superior to any bond subsequently generated between the adhesive sheet and most other surfaces to which the sheet is applied in service. This includes the reverse side of the backing film itself so that there is no danger of offsetting of the adhesive. The resultant adhesive sheet is thus economical to manufacture since one pass through the coating and drying machine is eliminated.

The invention has been described in preferred form and many changes may be made therein which will be comprised within its spirit. It is to be understood, therefore, that the invention is to be limited only by the prior art and the scope of the appended claims.

We claim:

1. A solvent spreadable, internally strong pressure-sensitive adhesive composition comprising a predominating portion of a condensation product of castor oil with a maleic half ester of a monohydric alcohol having a boiling point above 150° C., and a relatively minor portion of a compatible cohesive agent, said condensation product being in a semi-solid state and having a torsional moment measurement within the range 80,000 and 800,000 dyne centimeters, as measured at a temperature of 25° C. on a rotational plastometer of the character described.

2. A solvent spreadable, internally strong pressure-sensitive adhesive composition comprising a predominating portion of a condensation product of castor oil with a maleic half ester of a monohydric alcohol having a boiling point above 150° C., a compatible cohesive agent and a compatible tackifying agent, said condensation product being in a semi-solid state and having a torsional moment measurement within the range 80,000 and 800,000 dyne centimeters, as measured at a temperature of 25° C. on a rotational plastometer of the character described.

3. A solvent spreadable, internally strong pressure-sensitive adhesive composition comprising a predominating portion of a condensation product of castor oil with a maleic half ester of a monohydric alcohol having a boiling point above 150° C., and a compatible cohesive agent comprising nitrocellulose, said condensation product being in a semi-solid state and having a torsional moment measurement within the range 80,000 and 800,000 dyne centimeters, as measured at a temperature of 25° C. on a rotational plastometer of the character described.

4. A solvent spreadable, internally strong pressure-sensitive adhesive composition comprising a predominating portion of a condensation product of castor oil with a maleic half ester of a monohydric alcohol having a boiling point above 150° C., and a compatible cohesive agent comprising ethyl cellulose, said condensation product being in a semi-solid state and having a torsional moment measurement within the range 80,000 and 800,000 dyne centimeters, as measured at a temperature of 25° C. on a rotational plastometer of the character described.

5. A solvent spreadable, internally strong pressure-sensitive adhesive composition comprising a predominating portion of a condensation product of castor oil with a maleic half ester of a monohydric alcohol having a boiling point above 150° C., a compatible cohesive agent and a compatible tackifying agent which is predominantly rosin, said condensation product being in a semi-solid state and having a torsional moment measurement within the range 80,000 and 800,000 dyne centimeters, as measured at a temperature of 25° C. on a rotational plastometer of the character described.

6. A solvent spreadable, internally strong pressure-sensitive adhesive composition comprising 70 to 100% of a condensation product of castor oil with a maleic half ester of a monohydric alcohol having a boiling point above 150° C., a compatible cohesive agent not in excess of 20%, and a compatible tackifying agent not in excess of 25% and which is predominantly rosin, said condensation product being in a semi-solid state and having a torsional moment measurement within the range 80,000 and 800,000 dyne centimeters, as measured at a temperature of 25° C. on a rotational plastometer of the character described.

7. An adhesive sheet comprising a non-fibrous flexible film backing having a smooth lustrous surface and an internally strong pressure-sensitive adhesive directly applied thereto from solvent, said adhesive comprising a condensation product of castor oil with a maleic half ester of a monohydric alcohol having a boiling point above 150° C., and a compatible cohesive agent, said condensation product being in a semi-solid state and having a torsional moment measurement within the range 80,000 and 800,000 dyne centimeters, as measured at a temperature of 25° C. on a rotational plastometer of the character described.

8. An adhesive sheet comprising a non-fibrous flexible cellulosic film backing having a smooth lustrous surface and an internally strong pressure-sensitive adhesive applied directly thereto from solvent, said adhesive comprising a condensation product of castor oil with a maleic half ester of a monohydric alcohol having a boiling point above 150° C., and a compatible cohesive agent, said condensation product being in a semi-solid state and having a torsional moment measurement within the range 80,000 and 800,000 dyne centimeters, as measured at a temperature of 25° C. on a rotational plastometer of the character described.

RUDOLF J. PRIEPKE.
JOHN H. EMIGH.
C. OLSON PIKE.